April 18, 1967 N. O. ROSAEN 3,314,541
AIR PURGED FILTER DEVICE
Filed Dec. 23, 1963
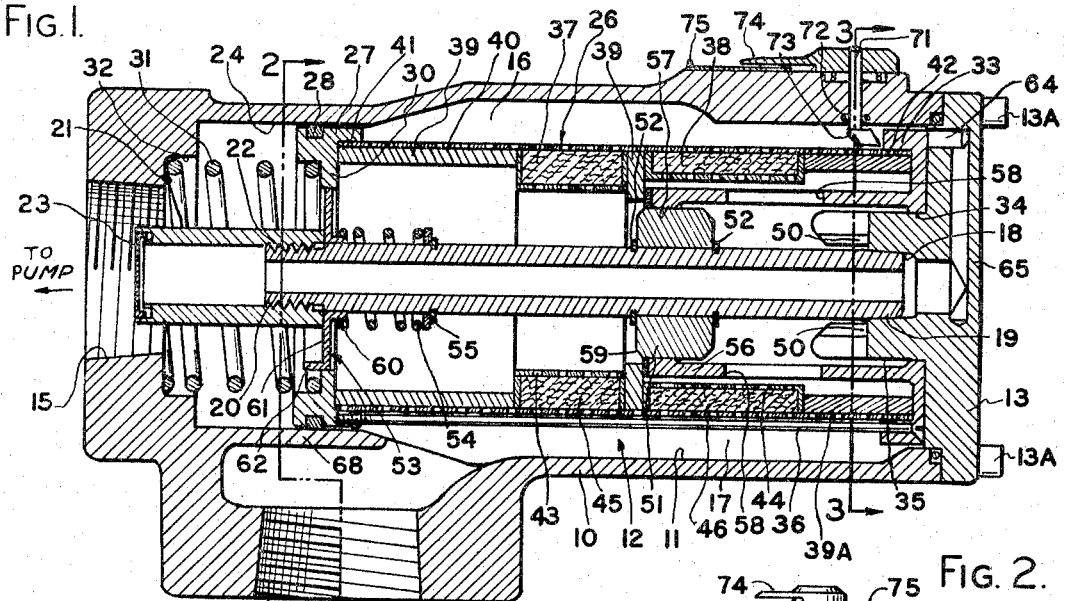
Fig. 1.
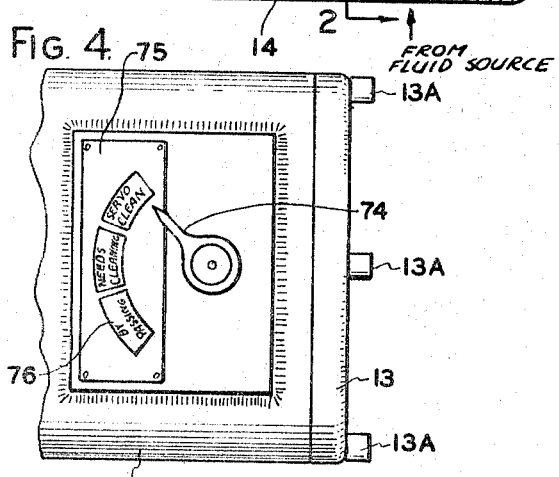
Fig. 4.
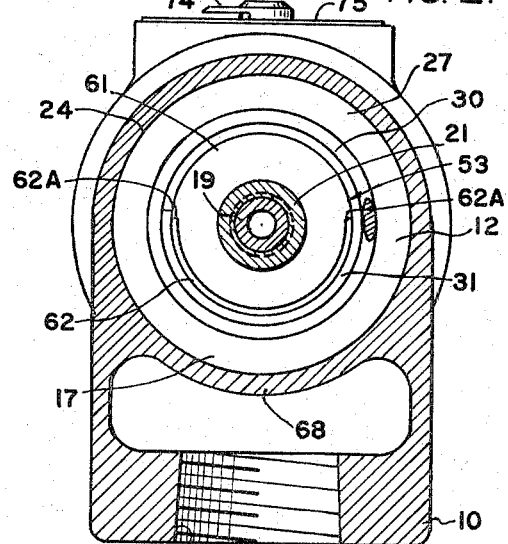
Fig. 2.
Fig. 3.
INVENTOR.
NILS O. ROSAEN
BY Hauke & Hauke
ATTORNEYS

United States Patent Office 3,314,541
Patented Apr. 18, 1967

3,314,541
AIR PURGED FILTER DEVICE
Nils O. Rosaen, Bloomfield Hills, Mich., assignor to The Rosaen Filter Company, Hazel Park, Mich., a corporation of Michigan
Filed Dec. 23, 1963, Ser. No. 332,359
15 Claims. (Cl. 210—90)

The present invention relates to filter devices, particularly to such devices having means proportionally increasing fluid flow through secondary filter elements as a primary filter element becomes clogged and more particularly to such a device having means operable to release air entrapped therein.

My copending application Ser. No. 186,075, filed April 9, 1962, and now Patent No. 3,224,583, discloses a multiple filter device in which means are provided to proportionally open fluid flow through a secondary filter element as the primary filter element becomes clogged. Further, means are disclosed therein for opening a bypass around the filter elements as both become clogged. In this way a substantially constant outlet pressure is maintained during the operation of the device.

Various operating conditions may result in air becoming trapped in the filter housing, which air may be ejected at irregular intervals in large amounts, possibly damaging associated system components, and the presence of air, which is compressible, will tend to upset the uniform outlet pressure desired. The problem of air entrapment has been solved for simple filter devices in one manner as I have shown in my U.S. Patent No. 3,113,925, issued Dec. 10, 1963, in which air is drawn from the upper part of the filter cartridge chamber by passages leading to the interior of the filter, the slight pressure differential between the inside and outside of the cartridge being generally sufficient to withdraw the entrapped air.

However, in some cases, as with low flow rates, or upon starting fluid flow, and/or where the present multiple filter arrangement is being used, such mean do not always work satisfactorily.

It is a object of the present invention to improve multiple filter devices such as that disclosed in my aforementioned copending application and in filter devices such as that shown in my aforesaid patent by providing improved means operable to release air entrapped in such devices.

It is another object of the present invention to increase the efficiency of filter devices by providing means automatically operable to bleed air entrapped therein prior to fluid flow through the device.

It is yet another object of the present invention to improve filter devices by providing valve means operable upon initial fluid flow to divert said fluid flow through the upper portions of the filter device to remove air collected therein.

It is still another object of the present invention to provide a more efficient multiple filter device by providing a first and a second valve means operable in sequence to first divert fluid flow to sweep away entrapped air and then to proportionally open fluid flow through a secondary element as a primary element becomes clogged.

It is yet another object of the present invention to reduce the maintenance costs of filter devices by providing baffle means disposed intermediate the inlet and the filter element of such devices to divert entering fluid flow away from the direct impingement on the filter element.

Other objects and advantages of the present invention will be readily apparent to one skilled in the art to which the invention pertains upon reference to the following drawings in which like reference characters refer to like parts throughout the several views and in which FIG. 1 is a longitudinal cross sectional view of a multiple filter device of the present invention.

FIG. 2 is a cross sectional view taken substantially on line 2—2 of FIG. 1.

FIG. 3 is a cross sectional view taken substantially on line 3—3 of FIG. 1, and

FIG. 4 is a fragmentary elevational view as seen substantially from the top of FIG. 1.

Now referring to the drawings for a more detailed description of the present invention, a preferred filter device is shown as comprising a housing 10 provided with an inner wall 11 which defines a substantially cylindrical filter chamber 12. A cap member 13 is secured to the housing 10 by any means such as bolts 13A and closes one end of the chamber 12. An inlet 14 and an outlet 15 are provided in the housing 10 in communication with the chamber 12. The filter device is adapted for use in the position illustrated in FIG. 1 for reasons which will be more readily apparent as the description proceeds and for this reason an upper portion of the chamber 12 has been designated by the reference character 16 and a lower portion has been designated by the reference character 17.

The cap member 13 is provided with an axial recess 18 a portion of which provides support for a tubular member 19 preferably press fit within the recess 18. The tubular member 19 extends axially through the chamber 12 and terminates in a threaded end portion 20 axially spaced from the outlet 15. A tubular member 21 is provided with an internally threaded portion 22 which receives the threaded end portion 20 of the tubular member 19. The free end of the tubular member 21 preferably carries a screen cap 23.

A filter assembly 26 is slidably mounted in the filter chamber 12 intermediate the inlet 14 and the outlet 15. The filter assembly 26 preferably comprises an annular member 27 slidably engaging an annular inner wall 24 of the housing 10. A piston ring seal 28 prevents fluid leakage between the number 27 and the wall 24. The member 27 is provided with a radially inwardly extending flange portion 30 which provides the seat for one end of a spring member 31. The other end of the spring member 31 is seat against an annular shoulder 32 provided in the housing 10 concentric to and adjacent the outlet 15.

The filter assembly 26 also preferably includes an annular member 33 positioned in axial alignment with the member 27 by means of a plurality of annularly spaced screws 36. The annular member 33 is provided with an axially extending inner annular surface portion 34 which slidingly engages the outer cylindrical surface of an axially extending boss portion 35 provided on the cap member 13.

A pair of filter elements 37 and 38 are carried in axially spaced positions intermediate the members 27 and 33 and spaced therefrom by cylindrical spacer elements 39 and 39A. A perforated outer shell 40 seats against inner annular flanges 41 and 42 provided on the members 27 and 33 respectively and retains the spacer elements 39 and the filter elements 37 and 38 in the desired position. The filter elements 37 and 38 are provided with inner perforated shells 43 and 44 respectively and fillers of porous material 45 and 46 respectively.

The boss portion 35 is preferably provided at its free end with a plurality of annular spaced slots 50. An annular valve member 51 is carried on the tubular member 19 and retained by a pair of spaced snap rings 52 in a position axially spaced from the boss portion 35. Another valve member 53 is carried on the tubular member 19 and is retained in position by the inner end of the tubular member 21 and a spring member 54 carried on the tubular member 19 and compressed against a seat 55.

The annular member 33 preferably has an elongated axially extending inner cylindrical portion 56 disposed radially inwardly of and concentric to the spacer element 39A and the filter element 38 and provided with a plurality of annularly spaced slots 58. A radially inwardly extending beveled flange portion 57 ise provided on the free end of the cylindrical portion 56. The valve member 51 is provided with a beveled edge 59. As can best be seen in FIG. 1, the flange portion 57 extends to a position closely adjacent the valve member 51 so that when the filter assembly 26 is positioned as shown, fluid flow between the valve member 51 and the flange portion 57 is substantially prevented so that practically no fluid is filtered by the filter element 38.

The valve member 53 preferably comprises an axially extending portion 60 slidably engaging the tubular member 19, and a radially extending portion 61. An axially extending flange 62 is provided on a part of the radial portion 61 so that a gap is provided on the upper portion of the valve member 53 between the ends 62A of the flange 62 as can best be seen in FIG. 2. The flange portion 30 of the member 27 extends radially inwardly to a position closely adjacent the valve member 53 so that when the filter assembly 26 is positioned as shown in FIG. 1, substantially no fluid flows past the valve member 53.

As can best be seen in FIG. 1, the cap member 13 is provided with a passage 64 opening to the upper portion 16 of the filter chamber 12 at a point closely adjacent the upper portion of the wall 11. Another passage 65 is provided in the cap member 13 communicating the passage 64 with the recess 18.

A baffle 68 is provided in the housing 10 closely adjacent the inlet 14 so that incoming fluid is deflected from direct impingement against the filter assembly 26 but is instead diverted annularly and axially into the chamber 12.

In the embodiment illustrated, the filter element 37 is provided with a filter 45 of fine porous material and the filter element 38 is provided with a filter 46 of a relatively coarse porous material.

The housing 10 is preferably provided with an opening 70 which rotatably carries a pin 71. O-ring seals 72 prevent fluid leakage past the pin 71. An arm element 73 is secured to the interiorly positioned end of the pin 71 and has a portion engaging the annular member 33 so that axial movement of the filter assembly 26 will rotate the pin 71. A pointer element 74 is secured to the exteriorly positioned end of the pin 71 to rotate therewith. An indicator plate 75 is provided on the exterior surface of the housing 10 and provides indicia 76 which with the pointer element 74 indicates the axial position of the filter assembly 26.

The filter device of the present invention is adapted for use only in the position shown in the drawing as has been explained above. As the device is put in operation, the filter assembly 26 will be in the axial position shown in the drawings with the valve members 51 and 53 in their closed positions. Fluid will enter the filter chamber 12 through the inlet 14 forcing the air entrapped in the device into the upper portion 16 of the filter chamber 12 where it will be swept axially by the fluid toward the cap 13 end and expelled out through the passages 64, 65, recess 18, tubular member 19 and out the outlet 15. The pressure differential across the members 27 and 33 will cause the filter assembly 26 to move axially against the force of the spring member 31. During initial movement of the filter assembly 26 the valve member 51 will remain closed and the valve member 53 will open a sufficient amount to initially provide fluid flow through the gap provided in the upper part of the valve member 53 between it and the outlet 15. This initial flow of fluid through the valve member 53 since it will be produced at the upper edge of the valve member 53 will tend to carry with it any air which may be entrapped in the upper inner portions of the filter element and in the upper portions of the filter chamber 12 downstream of the valve member 53.

Further movement of the filter assembly 26 will cause the flange portion of the annulus 27 to move past the flange 62 of the valve member 53 so that the valve member 53 will then assume a fully opened position. The valve member 51 will, however, remain closed so that substantially all of the fluid will flow through only the filter element 37, through the valve 53 and out the outlet 15.

As the filter element 37 becomes clogged, the pressure differential across the members 27 and 33 will increase further moving the filter assembly 26 axially away from the boss portion 35. The filter assembly 26 will continue to move variably relative to the increase in pressure differential until finally it opens fluid flow past the beveled flange portion 57 and the beveled end 59 of the valve member 51 until there is a sufficient flow of fluid through the filter element 38 and past the valve member 51 to equalize the pressures and forces acting across the members 27 and 33. It is apparent that the amount of fluid passing through the filter 38 will depend upon the axial position of the filter assembly 26 which in turn depends upon the amount of clogging present in the filter 37, providing proportional flow through both filters relative to degrees of clogging.

As the coarse filter 38 becomes clogged, the pressure differential increase across members 27 and 33 will move the filter assembly 26 even farther in a direction away from the boss portion. This movement will eventually open the slots 50 to the inlet side of the filter assembly 26 thus providing a bypass route which opens directly from the inlet 14 to the outlet 15 when both filter elements 37 and 38 are clogged and before either ruptures.

Since a small amount of fluid will flow past the valve member 51 at all times, there being no complete sealing thereof, the coarse filter element 38 will become slightly clogged as the filter element 37 is being used. This means that by the time the filter assembly 26 has moved to a position permitting increased flow through the filter element 38, a cake has formed on the surface of the filter element 38 which in effect transforms it into a fine filter element.

Each operating position of the filter device depends upon the longitudinal position of the filter assembly 26; thus each position will be accurately indicated on the exterior surface of the device by means of the indicator 74.

It is apparent that the filter elements 37, 38 may be replaced by other elements of different sizes by simply changing the sizes of the spacer elements 39. It is also apparent that a filter device has been described which is provided with effective means for purging the air entrapped in the chamber prior to and during use.

It will be noted that the position of the screen end of the tube 21 being within the outlet 15, fluid flow out the outlet 15 will produce a pressure drop which will continuously remove entrapped air from the upper chamber portion 16. The passages 64 and 65 are, however, small relative to the amount of fluid flow demanded, so that the greater proportion of fluid must flow through the filter elements 37 and 38.

Although I have described but one embodiment of the present invention, it will also be apparent that many changes and modifications may be made without departing from the spirit of the invention or the scope of the appended claims.

I claim:
1. A filter device comprising
   (a) a housing having an inlet and an outlet,
   (b) said housing having an inner wall defining a chamber communicating with said inlet and said outlet,
   (c) said housing being positioned in use to provide an upper portion of said chamber and a lower portion of said chamber,
   (d) a filter assembly carried in said chamber intermediate said inlet and said outlet,
   (e) conduit means provided in said housing and connecting said outlet with said upper portion of said chamber upstream of said filter assembly whereby fluid entering said chamber will force air entrapped therein through said conduit means and out said outlet, (f) said filter assembly comprising a filter element carried in said chamber intermediate said inlet and said outlet, (g) a valve means provided in said chamber and being operable to regulate fluid flow from the outlet side of said filter element to said outlet in response to the pressure difference across the filter assembly, and (h) said valve means being operable to be closed upon initial fluid flow into said inlet and said conduit being open at all times to provide communication between said upper portion of said chamber and said outlet whereby when said valve means is closed fluid is directed from the inlet through said upper portion of said chamber to said conduit means whereby air entrapped in said upper portion will escape through said conduit means and through said outlet.

2. The device as defined in claim 1 and in which (a) the upper portion of said chamber has a part thereof disposed downstream of said filter element between same and said outlet, (b) said valve means being operable upon initial opening thereof to direct fluid from the outlet side of said filter element through said chamber upper portion part to said outlet, whereby air entrapped in said part will be expelled through said outlet.

3. The device as defined in claim 2 and in which said filter assembly further comprises means responding to an increased pressure differential across said filter element to variably open said valve means.

4. A filter device comprising (a) a housing having a filter chamber and an inlet and an outlet communicating with said filter chamber, (b) said housing being positioned in use to provide an upper and a lower portion of said filter chamber, (c) a filter assembly axially slidably carried in said filter chamber and comprising a filter element having one side exposed to said inlet and another side exposed to said outlet, means provided in said housing and connecting said outlet with said upper portion of said chamber upstream of said filter element and being open at all times whereby fluid entering said chamber will force air entrapped therein through said means and out said outlet, (d) a normally closed valve means disposed intermediate said outlet side of said filter element and said outlet, (e) said valve means being operable to open fluid flow from said outlet side of said filter element to said outlet upon said filter assembly moving axially in one direction, (f) means responsive to an increase in pressure differential across said filter element to move said filter assembly in the direction opening said valve means, (g) said valve means including means operable only during movement from a closed position to a predetermined position to direct fluid flow through said upper portion of said housing downstream of said valve means whereby air entrapped therein is swept through said outlet.

5. The device as defined in claim 4 and including conduit means connecting said outlet with said upper portion of said filter chamber upstream of said valve means whereby air entrapped therein will escape through said conduit means and thronugh said outlet.

6. A multiple filter device comprising (a) a housing having an inlet and an outlet, (b) said housing having an inner wall defining a substantially cylindrical chamber communicating with said inlet, (c) said housing being positioned in use to provide an upper and a lower portion of said chamber, (d) a tubular member carried in said housing substantially coaxial with said filter chamber, (e) a filter assembly axially slidably carried in said housing and being substantially concentric with said tubular member, (f) said filter assembly comprising a first filter element and a second filter element each having an inlet side exposed to said inlet and an outlet side exposed to said outlet, (g) a first valve means carried on said tubular member and disposed intermediate said outlet side of said first filter element and said outlet, (h) a second valve means carried on said tubular member in a position axially spaced from said first valve means and intermediate said outlet side of said second filter element and said outlet and upstream of said outlet side of said first filter element, (i) said first valve means being operable upon axial movement of said filter assembly in one direction to open communication between said outlet side of said first filter element and said outlet, (j) said second valve means being operable upon further axial movement of said filter assembly in said direction to variably open communication between said second filter element and said outlet, and (k) means responsive to an increase in pressure differential across said filter elements to move said filter assembly in the direction opening said valve means.

7. The device as defined in claim 6 and in which one end of said tubular member is open to said outlet and including a passage provided in said housing communicating with said upper portion of said chamber upstream of said first valve means and the other end of said tubular member whereby air entrapped upstream of said first valve means will escape through said passage, through said tubular member and through said outlet.

8. The device as defined in claim 7 and including a third valve means disposed intermediate said inlet and said outlet and operable upon said filter assembly being moved to a position fully opening said second valve means to open a direct fluid path from said inlet to said outlet.

9. The device as defined in claim 8 and including indicator means carried on the exterior surface of said housing and being operably connected to said filter assembly to indicate the axial position thereof.

10. The device as defined in claim 9 and including baffle means provided in said housing intermediate said inlet and said filter assembly whereby fluid entering said inlet is deflected away from direct impingement on said filter elements.

11. The filter device as defined in claim 6 and including said first valve means having means operable only during movement from a closed position to a predetermined position intermediate a fully closed and a fully open position to direct fluid flow through said upper portion of said housing downstream of said first valve means whereby air entrapped therein is swept through said outlet.

12. A filter device, comprising (a) a housing having a filter chamber, an inlet and an outlet, (b) a filter in said chamber, (c) means directing fluid flow through said filter, (d) pressure responsive valve means blocking fluid flow from the outlet side of said filter to said outlet upon initial flow into said chamber and automatically opening fluid flow from the outlet side of said filter to said outlet thereafter, and (e) means connecting said chamber upstream of said filter to said outlet downstream of said valve means and being open at all times for exhausting entrapped air from said chamber prior to said valve opening fluid flow to said outlet from the outlet side of said filter.

13. The device as defined in claim 12 and in which
(a) said chamber has a first portion upstream of said filter and a second portion downstream of said filter,
(b) said exhausting means is operable to exhaust air entrapped in said first chamber portion,
(c) said valve means includes means effecting exhaust of air from said second chamber portion on initial opening of said valve means.

14. The filter device as defined in claim 12 and in which said exhaust means comprises
(a) passages formed in said housing and having one end connected with the upper portion of said chamber, and
(b) the tubular member extending axially through said chamber and having one end connected with said passages and the opposite end connected with said outlet.

15. The filter device as defined in claim 14 and in which said valve means comprises a valve member carried on the exterior surface of said tubular member adjacent but spaced from the outlet end thereof.

References Cited by the Examiner
UNITED STATES PATENTS

| | | | |
|---|---|---|---|
| 1,861,805 | 6/1932 | Lentz | 210—340 X |
| 2,418,777 | 4/1947 | LeClair | 210—436 X |
| 2,423,329 | 7/1947 | LeClair | 210—137 X |
| 3,113,925 | 12/1963 | Rosaen | 210—315 |
| 3,224,583 | 12/1965 | Rosaen | 210—90 |

REUBEN FRIEDMAN, *Primary Examiner.*

SAMIH N. ZAHARNA, *Examiner.*